(12) United States Patent
Halbauer et al.

(10) Patent No.: US 11,064,404 B2
(45) Date of Patent: Jul. 13, 2021

(54) HANDOVER METHOD FOR WIRELESS DATA TRANSMISSION SYSTEM

(71) Applicant: Alcatel Lucent, Nozay (FR)

(72) Inventors: Hardy Halbauer, Stuttgart (DE);
Anton Ambrosy, Stuttgart (DE);
Danish Aziz, Stuttgart (DE);
Hajo-Erich Bakker, Stuttgart (DE);
Volker Braun, Stuttgart (DE); Jens Gebert, Stuttgart (DE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/303,325

(22) PCT Filed: May 10, 2017

(86) PCT No.: PCT/EP2017/061116
§ 371 (c)(1),
(2) Date: Nov. 20, 2018

(87) PCT Pub. No.: WO2017/202604
PCT Pub. Date: Nov. 30, 2017

(65) Prior Publication Data
US 2019/0215738 A1 Jul. 11, 2019

(30) Foreign Application Priority Data
May 26, 2016 (EP) .................................... 16290091

(51) Int. Cl.
*H04W 36/00* (2009.01)
*H04W 36/08* (2009.01)
*H04W 36/30* (2009.01)

(52) U.S. Cl.
CPC ... *H04W 36/0069* (2018.08); *H04W 36/0058* (2018.08); *H04W 36/0085* (2018.08);
(Continued)

(58) Field of Classification Search
CPC ......... H04W 36/0069; H04W 36/0058; H04W 36/0088; H04W 36/08; H04W 36/30
See application file for complete search history.

(56) References Cited

U.S. PATENT DOCUMENTS

2011/0136484 A1* 6/2011 Braun ................... H04W 24/10
455/422.1
2015/0043492 A1 2/2015 Baek et al.
(Continued)

FOREIGN PATENT DOCUMENTS

CN 102197677 A 9/2011
CN 103581993 A 2/2014
(Continued)

OTHER PUBLICATIONS

International Search Report PCT/ISA/210 for International Application No. PCT/EP2017/061116 dated Jun. 2, 2017.
(Continued)

*Primary Examiner* — Omer S Khan
(74) *Attorney, Agent, or Firm* — Harness, Dickey & Pierce, P.L.C.

(57) ABSTRACT

A method of wireless data transmission at a first radio access point, including detecting a degradation of a first radio link established for a first frequency band between the first radio access point and a user equipment, and sending, addressed to a network entity, information to trigger a handover or handover decision of the wireless data transmission from the first radio link of the first radio access point operating in the first frequency band to a second radio link of a second radio access point operating in the first frequency band depending on the result of the detection.

7 Claims, 2 Drawing Sheets

(52) U.S. Cl.
    CPC ....... *H04W 36/0088* (2013.01); *H04W 36/08* (2013.01); *H04W 36/30* (2013.01)

(56) References Cited

U.S. PATENT DOCUMENTS

| | | | |
|---|---|---|---|
| 2015/0124708 A1* | 5/2015 | Blankenship | H04W 12/08 370/329 |
| 2016/0021581 A1* | 1/2016 | Deenoo | H04W 36/0069 370/331 |
| 2016/0205676 A1* | 7/2016 | Chen | H04B 7/0621 370/329 |
| 2016/0270075 A1* | 9/2016 | Huang | H04W 60/00 |

FOREIGN PATENT DOCUMENTS

| | | | |
|---|---|---|---|
| CN | 104349361 A | 2/2015 | |
| CN | 105144605 A | 12/2015 | |
| WO | WO-2014/113686 A2 | 7/2014 | |
| WO | WO-2015084855 A1 | 6/2015 | |
| WO | WO-2015/109153 A1 | 7/2015 | |

OTHER PUBLICATIONS

European Search Report for European Patent Application No. 16290091 dated Nov. 21, 2016.
Office Action dated Jun. 29, 2020, issued in corresponding Chinese Patent Application No. 201780032664.8.
HO signaling flow for small cell enhancement 3GPP Tsg-Ran WG3 Meeting #82, R3-132227, Nov. 2013.
Office Action dated Feb. 18, 2021, issued in corresponding Chinese Patent Application No. 201780032664.8.

\* cited by examiner

# HANDOVER METHOD FOR WIRELESS DATA TRANSMISSION SYSTEM

CROSS-REFERENCE TO RELATED APPLICATIONS

This application is a national phase under 35 U.S.C. § 371 of PCT International Application No. PCT/EP2017/061116 which has an International filing date of May 10, 2017, which claims priority to European Application No. 16290091.4, filed May 26, 2016, the entire contents of each of which are hereby incorporated by reference.

FIELD OF THE INVENTION

The invention concerns a method and device for wireless data transmission.

BACKGROUND

In a radio access network base stations provide wireless connectivity to user equipment in a coverage area. The base station provides typically low-frequency band coverage to the user equipment, i.e. in a frequency band below 6 GHz.

In a radio access network base stations and user equipment operate for example according to the long term evolution standard, the long term evolution advanced standard or the presently available concepts for the 5G standard. This way the radio access network provides low-frequency band coverage.

WO 2014/113686 A2 discloses a measurement reporting procedure for reporting a small cell layer measurement to a macro cell layer for use to make a handover decision.

U.S. 2015/0043492 A1 discloses that a master eNB orders a handover from a SeNB 1 to a SeNB 2.

Millimeter wave radio access points or other radio access points and compatible user equipment may be used in a radio access network for capacity enhancement, i.e. higher data rates. They operate with radio signals in a millimeter wave frequency band, i.e. within the band of radio frequencies in the electromagnetic spectrum from 30 to 300 gigahertz. High data throughput is achievable by millimeter wave radio transmission. In general any radio access point operating with frequencies larger than 6 gigahertz may be used.

To provide redundant coverage, multiple radio access points operating in a first frequency band are placed within the coverage area of a base station operating in a second frequency band.

Due to obstructions in the coverage area of radio access points operating in the first frequency band, the data transmission quality may suffer. Millimeter wave radio access points can use high bandwidth which allows very high data rates. There will often be obstructions for such radio access points and not for low-frequency band nodes operating in the second frequency band. But low-frequency band nodes can only use a limited bandwidth capacity, which allows only "low" data rates.

When the user equipment moves relative to the serving radio access point or there are changes in the environment, e.g. a truck blocks the data transmission, it may lose the coverage area of that radio access point or the Line Of Sight between user equipment and radio access point is blocked for a certain time.

Due to the propagation characteristics of millimeter wave radio signals, link blockage may appear in the link between a user equipment and a millimeter wave radio access point suddenly due to obstruction in one or all possible paths between a access point and the user equipment. This blockage may cause high interruption times.

SUMMARY

It is therefore an objective of the present invention to provide a seamless handover from one radio access point to another radio access point in the transmission of data via radio connection.

This goal is achieved by a method of wireless data transmission at a first radio access point, the method comprising:
  detecting a degradation of a first radio link established for a first frequency band between the first radio access point and a user equipment,
  sending, addressed to a network entity, information for triggering a handover decision of the wireless data transmission from the first radio link of the first radio access point operating in the first frequency band to a second radio link of the second radio access point operation in the first frequency band depending on the result of the detection.

Advantageously the information sent to the network entity comprises information regarding the degradation of the first radio link.

Advantageously the degradation of the first radio link is detected based on a performance indicator for an uplink signal transmitted via the first radio link.

Advantageously the performance indicator is a physical link quality.

Advantageously the performance indicator is detected by the first radio access point based on an uplink pilot signal or a status of a hybrid automatic repeat request process.

The invention concerns also a method of wireless data transmission at the network entity for triggering a handover or handover decision of the wireless data transmission from a first radio link to a second radio link, the method comprising:
  receiving information based on a performance indicator,
  sending, addressed to a user equipment, a trigger for a measurement of radio link quality for the second radio link,
  receiving a result of a measurement of the radio link quality for the second radio link,
  sending, addressed to the user equipment, a trigger for a handover of the data transmission from the first radio link to the second radio link depending on the result of the measurement.

Advantageously the first radio link is between a first radio access point operating in a first frequency band and the user equipment, the second radio link is between a second radio access point operating in the first frequency band and the user equipment, and the trigger for the handover is sent via a third radio link between the user equipment and the network entity operating in a second frequency band.

Advantageously the second radio access point for the second radio link is selected, by the network entity, from a measurement report of the user equipment containing a plurality of radio access points operating in the first frequency band.

Advantageously the degradation of the first radio link is detected by comparison of a performance indicator, received as the result of the measurement, to a predetermined or configurable threshold.

Advantageously the performance indicator is a physical link layer quality and/or a status of a hybrid automatic repeat request process.

The network node for wireless data transmission, comprising:
a transceiver operable for receiving information for triggering a handover or handover decision of the wireless data transmission from a first radio link to a second radio link,
the transceiver operable for sending, addressed to the user equipment, a trigger for a measurement of radio link quality for the second radio link,
the transceiver operable for receiving a result of the measurement of the radio link quality of the second radio link,
the transceiver operable for sending a trigger, addressed to the user equipment, for a handover or handover decision of the data transmission from the first radio link to the second radio link depending on the result of the measurement.

Advantageously the first radio link is between a first radio access point operating in a first frequency band and the user equipment, wherein the second radio link is between a second radio access point operating in the first frequency band and the user equipment, and the trigger for the handover or handover decision is sent via a third radio link between the user equipment and the network entity operating in a second frequency band.

The radio access point for transmitting data, comprising:
a first transceiver operable for detecting a degradation of a first radio link between the first radio access point operating in a first frequency band and a user equipment,
a second transceiver operable for sending, addressed to a network entity, information for triggering a handover or handover decision of the wireless data transmission from the first radio link to a second radio link depending on the result of the detection.

Advantageously the information sent to the network entity comprises information regarding the degradation of the first radio link.

Advantageously the degradation of the first radio link is detected based on a performance indicator for an uplink signal transmitted via the first radio link.

Advantageously, for measurement of radio link quality of different downlink radio signals e.g. coordinated in the time domain are transmitted via at least two radio access points that are different from the first radio access point and that are potentially in range for a radio link to the user equipment.

Further developments of the invention can be gathered from the dependent claims and the following description.

DESCRIPTION OF THE EMBODIMENTS

Figure 1:
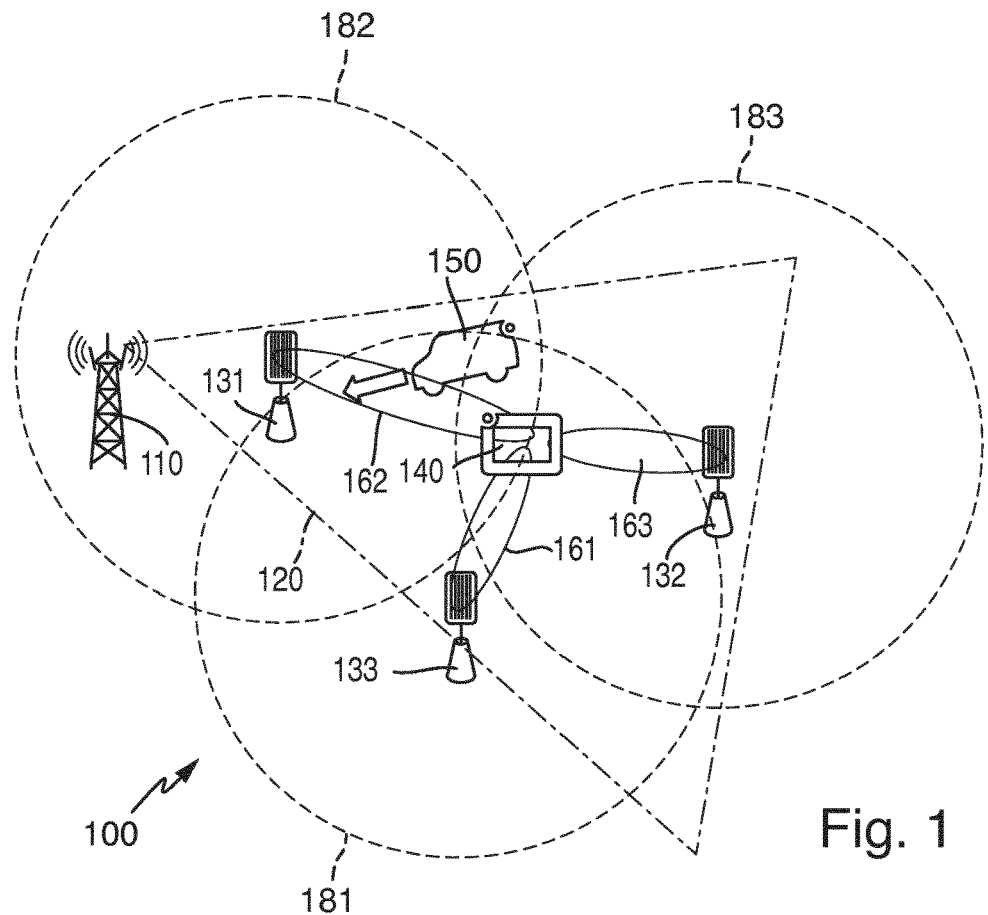
FIG. 1 schematically depicts part of a radio access network.

FIG. 1 schematically depicts part of a radio access network 100. The radio access network 100 provides connectivity with multiple radio access technologies.

A network node 110, for example an evolved node B or a 5G node, referred to as eNB below, provides connectivity according to one of the aforementioned standards in a coverage area 120. The network node 110 is for example a base station configured as eNB according to the long term evolution standard or a 5G node of the upcoming 5G standard. The network node 110 may be additionally or alternatively configured as Radio Access Network (RAN) Controller.

A plurality of radio access points 131, 132, 133 preferable millimeter wave radio access points or access points operating above 6 GHz, provide radio access in respective coverage areas 181, 182, 183 using beams 161, 162, 163 that overlap at least temporarily, at least partially with the coverage area 120 and the location of user equipment 140. Beams 161, 162, 163 are exemplary beams; the coverage area 181, 182, 183 is the sweep area of the beams, i.e. sectors within which respective beams 161, 162, 163 can be controlled. A beam 161, 162, 163 is a dedicated beam for user equipment 140 if it is controlled to overlap with the location of user equipment 140. Each radio access point may provide a certain number of dedicated beams 161, 162, 163 depending on the location of user equipment 140.

The plurality of radio access points 131, 132, 133 and the network node 110 are adapted to exchange data and access points related control messages, e.g. via Xn interfaces, for specific user equipment.

The plurality of radio access points 131, 132, 133 are adapted to provide respective radio links to the user equipment 140 in a first frequency band. In the example the first frequency band is a section of the spectrum of radio communication frequencies above 6 GHz. In the example the user equipment 140 is connected to a first radio access point 131 via a first radio link 142 in the first frequency band. In the example the user equipment 140 is connectable to a second radio access point 132, 133 via a second radio link in the first frequency band as well.

The network entity 110 is adapted to provide a third radio link 144 to the user equipment 140 in a second frequency band. The second frequency band is different from the first frequency band. The second frequency band in the example is a section of the spectrum of radio communication frequencies below 6 GHz.

User related control messages can be sent by the network node 110 to user equipment 140 in the second frequency band or to user equipment 140 via any of the radio access points 131, 132, 133 in the first frequency band, if a radio link is established towards the user equipment 140.

When the user equipment 140 moves relative to a first radio access point 131, it is currently connected to for transmission of data, or there are changes in the environment, e.g. a truck 150 blocks the data transmission, the user equipment 140 loses the connection to the first radio access point 131.

Figure 2:
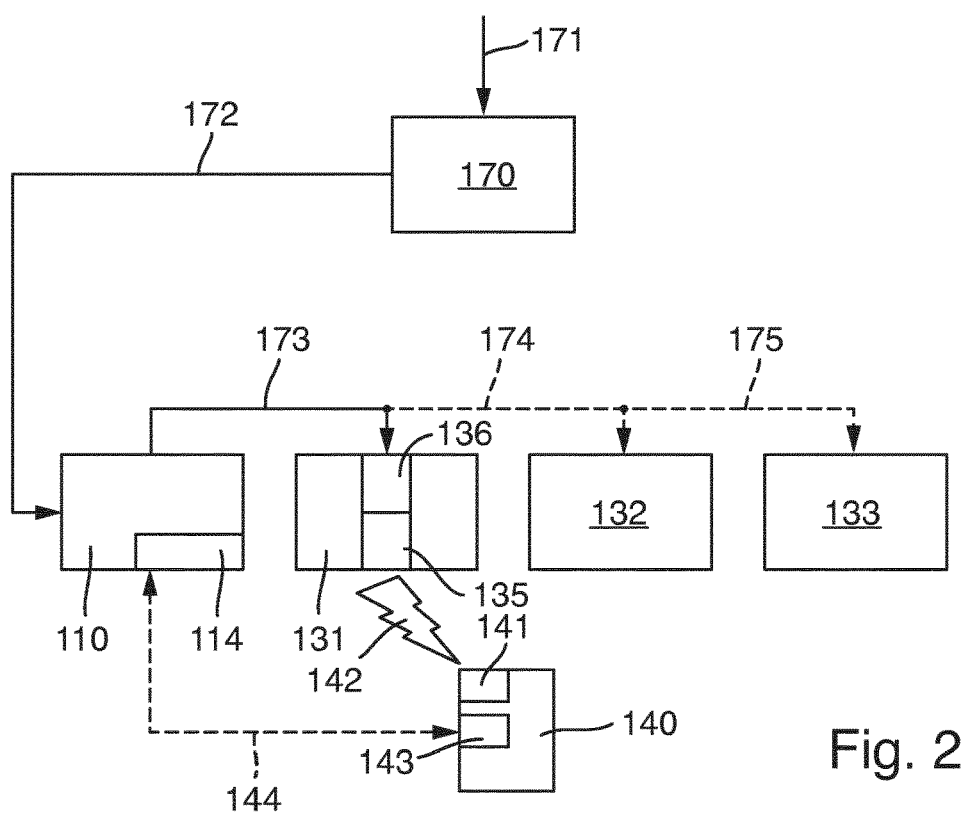
FIG. 2 schematically depicts a signal path according to an exemplary radio access network.

Referencing FIG. 2, user equipment 140 is configurable to receive data and/or control messages in the second frequency band via the third radio link 144 provided by the network node 110. Furthermore, user equipment 140 is configurable to receive data via the first radio link 142 provided by the first radio access point 131.

Likewise user equipment 140 is configurable to receive data via a plurality of second radio access points 132, 133. The plurality of second radio access points 132, 133 are connectable to the base station 110 via respective data links 174, 175.

In the example user equipment 140 is configured to permanently receive data via either of the radio links.

Downlink data 171 enters the radio access network 100 via a core unit 170 and is received by the base station 110 via a data link 172 from the core unit 170.

The first radio access point 131 in the example functions as the initial serving node. This means it is configured for this dedicated user equipment 140. Protocol Data Units, e.g. comprising Packet Data Convergence Protocol (PDCP) data and/or Network Control Signalling (NCS) data may be used. In the following, an example is described using Packet Data Convergence Protocol data. The mechanism is the same for any other Protocol Data Units. In the example forwarded Packet Data Convergence Protocol (PDCP) data is received by the first radio access point 131 via a data link 173 from base station 110. This data will be transmitted to the user equipment 140 via the first radio link 142.

Additionally, data according to the Radio Resource Control Protocol is used for signalling between the base station 110 and the user equipment 140 via the third radio link 144.

In the example, network node 110 is a network entity comprising a transceiver 114 for the exchange of Radio Resource Control Protocol messages.

The first radio access point 131 comprises a transceiver 135 for communication with the user equipment 140 via the first radio link 142 and a transceiver 136 for communication with the network node 110 via data link 173.

The user equipment 140 comprises a first transceiver 141 and a second transceiver 143.

The first transceiver 141 of user equipment 140 is operable to communicate with the transceiver 135 of the first radio access point 131 via the first radio link 142.

The second transceiver 143 of the user equipment 140 is operable to communicate with a transceiver 114 of the network node 110, e.g. the base station, via the third radio link 144.

Figure 3:
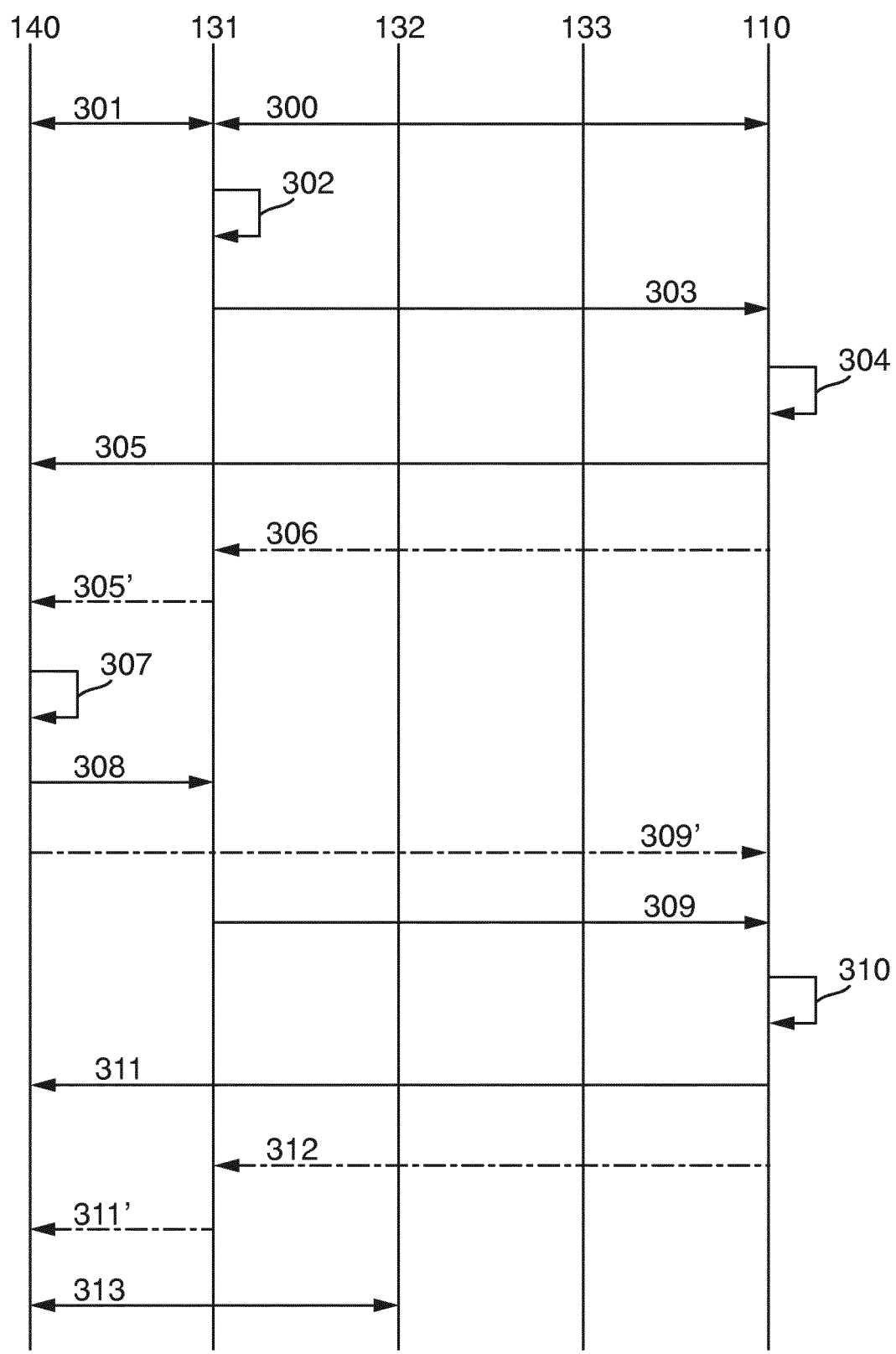
FIG. 3 schematically depicts a message sequence diagram.

Referencing FIG. 3, the signalling for a handover of wireless data transmission from the first radio link 142 between the first radio access point 131 and user equipment 140 to establish the second radio link between the second radio access point 132 and user equipment 140 is described below.

A connection 300, 301 for transmitting data between the network node 110, e.g. the base station, and the user equipment 140 via the first radio access node 131 is depicted.

In a step 302, the degradation of the link quality of the first radio link 142 is detected. Preferably the degradation is detected by comparison of a performance indicator, e.g. predetermined quality parameter and a predetermined or configurable threshold. For processing this information several criteria are described below. Goal is to trigger the handover or handover decision before the detected degradation of the link quality is too high, e.g. the performance indicator is below the predetermined or configurable threshold.

In the example, the degradation of the link quality of the first radio link 142 is detected at the first radio access point 131.

Alternatively or additionally the degradation of the link quality may be communicated to the network node 110, e.g. the base station, depending on related information detected by the first radio access point 131.

The performance indicator is for example a physical link layer quality. This performance indicator is measured by the first radio access point 131, e.g. based on the uplink pilot signal of the user equipment 140. As status of a hybrid automatic repeat request process, the rate of Hybrid automatic repeat request No Acknowledgements/Negative Acknowledgements, well known as HARQ NACKs, received from the user equipment 140 may be used as well.

This provides early detection of link quality degradation in the first radio access point 131.

In the example, a first message is received in step 302 by the first radio access point 131. The first message, e.g. the pilot signal or a HARQ NACK, triggers in the example sending of a second message 303 to the network node 110, e.g. the base station.

The second message 303 is addressed to the network node 110, e.g. the base station, and contains in the example information regarding a degradation of the link quality of the first radio link 142. Alternatively or additionally the second message 303 contains information to trigger measurement for a handover.

Upon receipt of the second message 303, in a step 304, information regarding the degradation of the first radio link 142 is processed.

For processing this information several criteria are described below. Goal is to trigger the handover or handover decision before the detected degradation of the link quality is too high, e.g. the performance indicator is below the predetermined or configurable threshold.

Alternatively or additionally, when the second message 303 contains information to trigger measurement for a handover, this information is processed to trigger the measurement.

Based on Physical Link Layer Feedback

If the first radio access point 131 monitors the physical link layer quality, e.g. the Channel Quality Indication, insufficient link quality can be reported to the base station 110 as follows.

All Channel Quality Indication measurements are reported to the base station 110. In this case the evaluation and decision is performed by base station 110 in step 304.

To reduce the amount of reporting between the first radio access point 131 and the base station 110, a report of "insufficient link quality" can be based on a pre-processing of the physical link layer quality inside the first radio access point 131.

This pre-processing may be configured by base station 110 using corresponding control commands.

For example two measurement reports may be supported:

"insufficient link quality" as trigger towards the base station 110 to start measurements of user equipment 140 for alternative access points to replace the data transmission link of the first radio access point 131;

"rapid radio access point change required" as trigger for the execution of the handover of user equipment 140 to an alternative access point, which has already been reported as suitable serving access point.

The advantages of this criterion are:

the handover needs not to rely on periodic measurements of all radio access points 131, 132, 133. This avoids overhead since no measurements on each possible beam of each radio access point 131, 132, 133 is required;

the handover is triggered by the base station 110. Base station 110 is an instance which operates in the second frequency band to provide the third radio link 144 to user equipment 140, which is a link with higher reliability than the first radio link 142 of the first radio access point 131;

the handover procedure is initiated already before current radio link 142 is degraded too much even if radio link 142 breaks, the handover procedure is already executed via the reliable second frequency band connection;

before the handover, a measurement of the link quality to the other radio access points 132, 133 is triggered. This way it is ensured that possible handover access point candidates are still available and not also affected by blocking.

The network node 110, e.g. the base station or the eNB, may trigger the user equipment 140 using the signalling according to the Radio Resource Control protocol.

Based on Hybrid Automatic Repeat Request Processes

The status of the Hybrid automatic repeat request processes may be used as an indicator for the link quality:

The first radio access point 131 monitors the number of Hybrid automatic repeat request retransmissions or notices that the Hybrid automatic repeat request timer expires. If a threshold, configured by base station 110 or other Operations and Management function entities, is reached, the first radio access point 131 triggers the base station 110. Base station 110 requests proactively measurement reports from the user equipment 140 for the links to the second radio access points 132, 133.

This way, most recent data can be used for the handover decision.

The base station 110 may trigger the handover to the second radio access point 132 out of a cluster of second radio access points 132, 133 to serve the user equipment 140. Preferably the second radio access point 132 having currently the best link quality according to the measurement report is selected. The cluster preferably contains a subset of access points most likely in range for the user equipment 140. The cluster may be determined by means of self-organizing network (SON) mechanisms, e.g. sampling measurements and maintaining records.

This means the second radio access point 132 is selected, by the network entity, e.g. base station 110, from a plurality of radio access points 132, 133 currently in range for a radio link to the user equipment 140.

The advantages of this criterion are:
the threshold can be set flexibly to adjust the sensitivity of the degradation detection;
the handover procedure is initiated already before the current link quality is degraded too much;
even if the first radio link 142 breaks, the handover procedure is already executed via the reliable third radio link 144 operating in the second frequency band;
before the handover measurements of the link quality to the other radio access points 132, 133 are triggered. This way it is ensured that possible handover access point candidates are still available and not also affected by blocking.

The network node 110, e.g. the base station, may trigger the user equipment 140 using the signalling according to the Radio Resource Control protocol.

Based on the Combination of Physical Link Layer Feedback and Hybrid Automatic Repeat Request In a combination of both criteria, physical link layer measurements may be triggered in case Hybrid automatic repeat request processes indicate degradation.

In any case the network node 110, e.g. the base station, requests proactively measurement reports from the user equipment 140 for the links to any second radio access point 132, 133 potentially in range of the user equipment 140.

This request is sent in a fourth message 305 addressed to the user equipment 140.

The request in the fourth message 305 is for example a trigger for a measurement of link quality for the second radio link between the second radio access point 132 and the user equipment 140.

The fourth message 305 is for example sent via the third radio link 144. This means, the trigger for the measurement is sent via the third radio link 144 in the second frequency band.

Alternatively or additionally, a fifth message 306 addressed to the user equipment 140 and containing the trigger for the measurement is sent to the first radio access point 131 and forwarded in a sixth message 305' via the first radio link 142, in the first frequency band to the user equipment.

The receipt of the fourth message 305 or the sixth message 305' triggers the user equipment 140 to execute measurements of new candidate radio access points and to report the measurements.

Upon receipt of the trigger for the measurement of link quality for the second radio link, in a step 307, the link quality for the second radio link to one or more of the second radio access points 132, 133 is measured.

Afterwards the result of the measurement is sent in a seventh message 308, addressed to the network node 110, e.g. the base station.

Afterwards, in the example, the seventh message 308 is sent to the first radio access point 131. The seventh message 308 is in the example forwarded as an eighth message 309 to the network node 110, e.g. the base station.

The seventh message 308, and hence the eighth message 309, is addressed to the network node 110, e.g. the base station, and contains information regarding a measurement of link quality of the second radio link.

Alternatively or additionally, a ninth message 309' addressed to the network node 110, e.g. the base station, and containing information regarding the measurement of the second radio link, may be sent via the third radio link 144.

Upon receipt of the eighth message 309 or the ninth message 309', in a step 310, the information regarding the measurement of the link quality of the second radio link is processed.

Preferably the handover or handover decision is triggered if the quality parameter is below the preconfigured threshold. Preferably, if more than one second radio access point 132, 133 is available for connecting via the second radio link to the user equipment 140, the second radio access point 132, 133 having the better link quality is selected.

Afterwards, in an eleventh message 311, the trigger for the handover of the data transmission from the first radio link 142 to the second radio link is sent depending on the result of the measurement.

The fourth message 305 is for example sent via the third radio link 144 addressed to the user equipment 140.

Alternatively or additionally, a twelfth message 312 addressed to the user equipment 140 and containing the trigger for the handover or handover decision is sent to the first radio access point 131 and forwarded in a thirteenth message 311' via the radio link 142, to the user equipment 140.

The receipt of the eleventh message 311 or the thirteenth message 311' triggers the user equipment 140 to execute the handover decision or to execute handover 313 to the second radio link, i.e. to the second radio access point 132. Executing the handover refers to the steps required for the handover. Executing the handover decision refers to the steps required for identifying parameters for the handover and may include executing the handover afterwards.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any sequence diagrams represent various processes which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method of wireless data transmission to trigger a handover or a handover decision of the wireless data transmission, comprising:
   detecting, by at least one first processor of a first radio access point, a degradation of a first radio link established for a first frequency band between the first radio access point and a user equipment based on a performance indicator of a radio link quality of the first radio link, the detected degradation being detected by a comparison of the performance indicator to a threshold;
   sending, by the at least one first processor to at least one second processor of a network entity, information on the detected degradation;
   sending, by the at least one second processor to the user equipment, a request for a measurement of a radio link quality for at least one second radio link in response to the detected degradation, the at least one second radio link being between a second radio access point operating in the first frequency band and the user equipment;
   receiving, by the at least one second processor from the user equipment, a result of the measurement; and
   sending, by the at least one second processor to the user equipment, a trigger for a handover or a handover decision of the wireless data transmission from the first radio link to the at least one second radio link depending on the result of the measurement,
   the request for the measurement, the trigger for the handover or the handover decision and the result of the second measurement being transmitted via a third radio link between the user equipment and the network entity which is operating in a second frequency band,
   the network entity being an evolved node B, a 5G node or a base station,
   the first frequency band being above 6 GHz and the second frequency band being below 6 GHz.

2. The method of claim 1, wherein the second radio access point for the at least one second radio link is selected by the network entity, from a plurality of radio access points.

3. The method according to claim 1, wherein the performance indicator is a physical link layer quality and/or a status of a hybrid automatic repeat request process.

4. A method of wireless data transmission to trigger in a user equipment a handover or a handover decision of the wireless data transmission comprising:
   measuring, by at least one first processor of the user equipment, a first measurement of a radio link quality of a first radio link, the first radio link operating in the first frequency band;
   generating and sending, by the at least one first processor of the user equipment to a first radio access point, a result of the first measurement to enable the first radio access point to detect a first degradation by a comparison of a performance indicator, received as a result of the first measurement, to a threshold;
   receiving, by the at least one first processor of the user equipment from at least one second processor of a network entity, a request for a second measurement of a radio link quality for at least one second radio link, the at least one second radio link being between a second radio access point operating in a second frequency band and the user equipment;
   sending, by the user equipment to the at least one second processor, a result of the second measurement of the radio link quality for the at least one second radio link; and
   receiving, from the at least one second processor by the at least one first processor of the user equipment, a trigger for a handover or a handover decision of the wireless data transmission from the first radio link to the at least one second radio link depending on the result of the second measurement;
   the request for the second measurement, the trigger for the handover or the handover decision and the result for the second measurement being transmitted via a third radio link between the user equipment and the network entity operating in a second frequency band, the first frequency band being above 6 GHz and the second frequency band being below 6 GHz.

5. A user equipment, comprising:

a memory storing computer-readable instructions; and at least one first processor configured to perform the computer-readable instructions in order to, measure a first measurement of a radio link quality of a first radio link, the first radio link operating in a first frequency band, generate and send, to a first radio access point, a result of the first measurement to enable the first radio access point to detect a first degradation by a comparison of a performance indicator, received as a result of the first measurement, to a threshold, receive, from at least one second processor of a network entity, a request for a second measurement of a radio link quality for at least one second radio link, the at least one second radio link being between a second radio access point operating in a second frequency band and the user equipment, send, to the at least one second processor of the network entity, a result of the second measurement of the radio link quality for the at least one second radio link, and receive, from the at least one second processor of the network entity, a trigger for a handover or a handover decision of a wireless data transmission from the first radio link to the at least one second radio link depending on the result of the second measurement, wherein the request for the second measurement, the trigger for the handover or the handover decision and the result of the second measurement being transmitted via a third radio link between the user equipment and the network entity operating in a second frequency band, the first frequency band being above 6 GHz and the second frequency band being below 6 GHz.

6. A system, comprising:

a first radio access point including at least one first processor; and a network entity including at least one second processor, the at least one first processor and the at least one second processor being configured to detect, by at least one first processor of the first radio access point, a degradation of a first radio link established for a first frequency band between the first radio access point and a user equipment based on a performance indicator of a radio link quality of the first radio link, the detected degradation being detected by a comparison of the performance indicator to a threshold, sending, by the at least one first processor to at least one second processor of the network entity, information on the detected degradation, send, by the at least one second processor to the user equipment, a request for a measurement of a radio link quality for at least one second radio link in response to the detected degradation, the at least one second radio link being between a second radio access point operating in the first frequency band and the user equipment, receive, by the at least one second processor from the user equipment, a result of the measurement, and send, by the at least one second processor to the user equipment, a trigger for a handover or a handover decision of for wireless data transmission from the first radio link to the at least one second radio link depending on the result of the measurement, the request for the measurement, the trigger for the handover or the handover decision and the result of the measurement being transmitted via a third radio link between the user equipment and the network entity which is operating in a second frequency band, the network entity being an evolved node B, a 5G node or a base station, the first frequency band being above 6 GHz and the second frequency band being below 6 GHz.

7. The system of claim 6, wherein the network entity is a base station.

* * * * *

UNITED STATES PATENT AND TRADEMARK OFFICE
CERTIFICATE OF CORRECTION

PATENT NO. : 11,064,404 B2  
APPLICATION NO. : 16/303325  
DATED : July 13, 2021  
INVENTOR(S) : Hardy Halbauer et al.

Page 1 of 1

It is certified that error appears in the above-identified patent and that said Letters Patent is hereby corrected as shown below:

In the Claims

Column 10, Lines 33-45, should read:
4. A method of wireless data transmission to trigger in a user equipment a handover or a handover decision of the wireless data transmission comprising:
    measuring, by at least one first processor of the user equipment, a first measurement of a radio link quality of a first radio link, the first radio link operating in a first frequency band;
    generating and sending, by the at least one first processor of the user equipment to a first radio access point, a result of the first measurement to enable the first radio access point to detect a first degradation by a comparison of a performance indicator, received as a result of the first measurement, to a threshold;

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*